United States Patent
Seragnoli

[15] 3,640,373
[45] Feb. 8, 1972

[54] DEVICE FOR ARRANGING ARTICLES SUPPLIED IN BULK AND INDIVIDUALLY AND SEQUENTIALLY DELIVERING THEM IN ALIGNMENT TO WRAPPING UP MACHINES

[72] Inventor: Ariosto Seragnoli, Bologna, Italy

[73] Assignee: G.D. Societa In Accomandita Semplice Di Enzo Seragnoli E Artosto Seragnoli, Bologna, Italy

[22] Filed: Mar. 3, 1970

[21] Appl. No.: 16,138

[30] Foreign Application Priority Data

Mar. 4, 1969 Italy..........................................1559/A

[52] U.S. Cl..............................................................198/30
[51] Int. Cl.....................................................B65g 47/26
[58] Field of Search................198/33 AA, 30; 221/171, 173, 221/56

[56] References Cited

UNITED STATES PATENTS

| | | | |
|---|---|---|---|
| 3,482,372 | 12/1969 | Hottendorf | 198/30 X |
| 1,862,351 | 6/1932 | Hagiwara | 198/30 UX |
| 2,941,651 | 6/1960 | Hutter et al. | 198/30 |

*Primary Examiner*—Evon C. Blunk
*Assistant Examiner*—Alfred N. Goodman
*Attorney*—Robert E. Burns and Emmanuel J. Lobato

[57] ABSTRACT

Articles such as chocolates are randomly supplied in bulk to near the center of a rotating disc. Fixed guiding means are located above the disc so that articles thereon are guided outwardly in a generally spiral path so that at the periphery of the disc oriented articles are sequentially and separately delivered to a wrapping-up machine. The guide members have at least one abutment surface angularly inclined to the vertical from the plane of the disc to assist orientation of the articles. Means for turning over articles onto a desired face may be included on the guide members.

7 Claims, 9 Drawing Figures

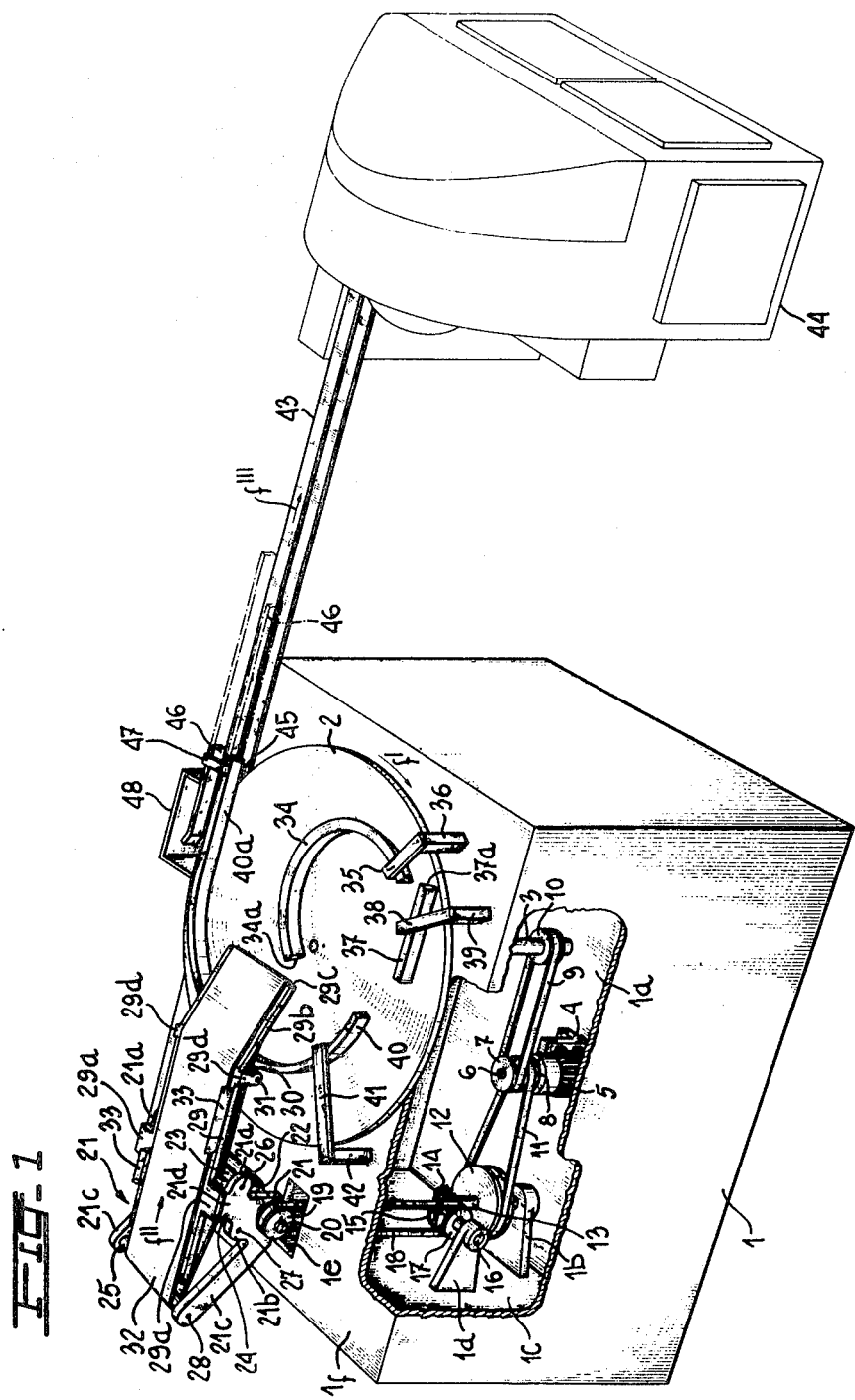

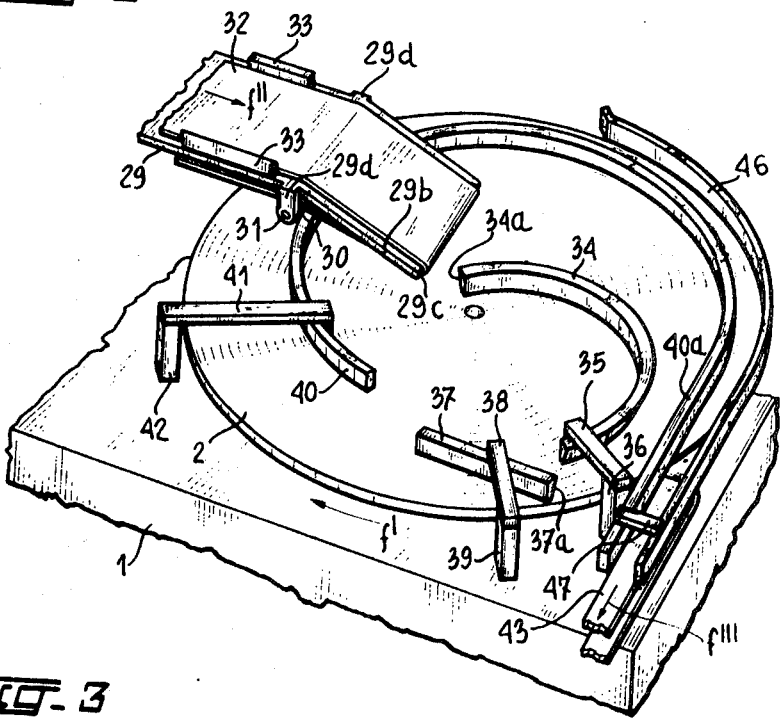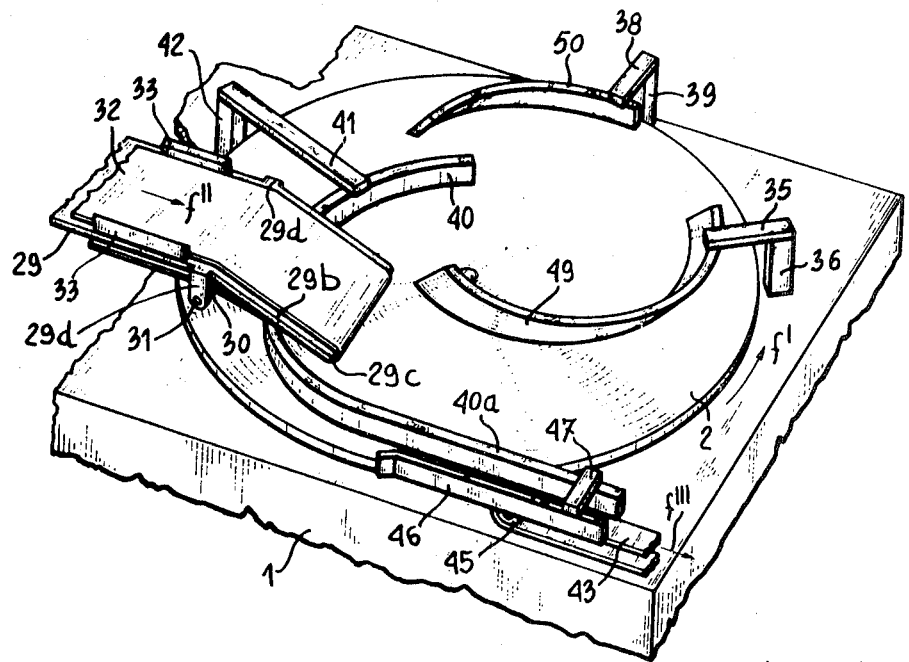

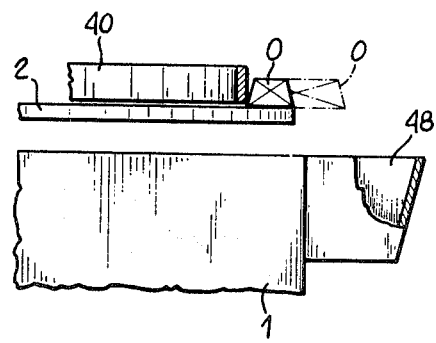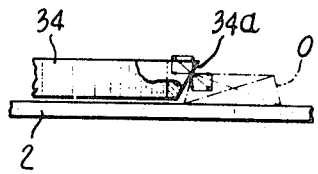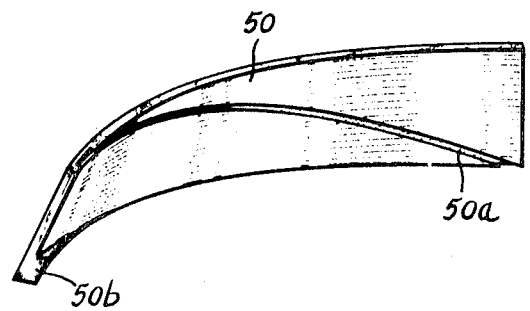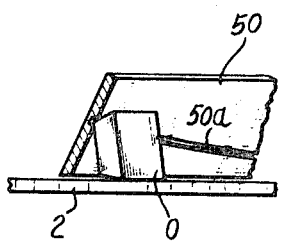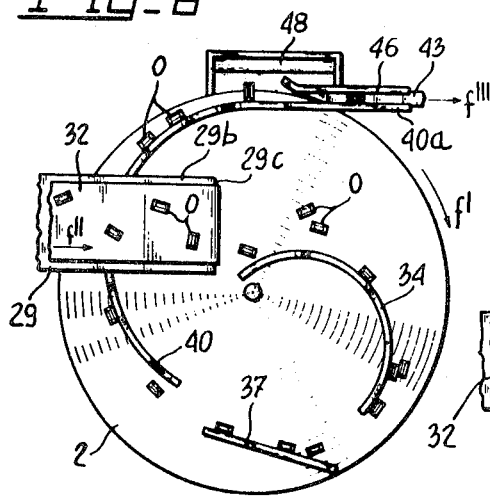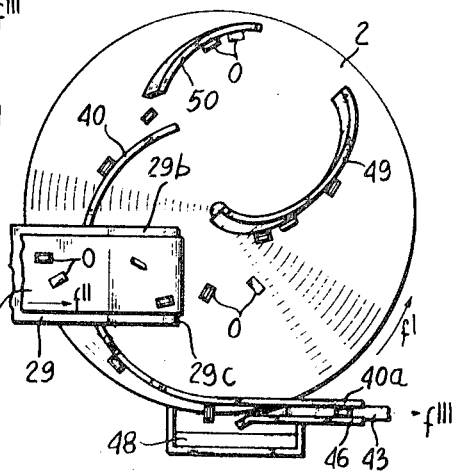

DEVICE FOR ARRANGING ARTICLES SUPPLIED IN BULK AND INDIVIDUALLY AND SEQUENTIALLY DELIVERING THEM IN ALIGNMENT TO WRAPPING UP MACHINES

This invention relates to devices for arranging and supplying articles, such as chocolates and other similar products which are bulk supplied to wrapping-up machines. More particularly, it is concerned with such devices capable of arranging such bulk supplied articles and individually and sequentially delivering them one after the other to wrapping-up machines in accordance with a predetermined single positioning array, that is with all of the articles oriented and positioned in the same direction.

As is well known, for such articles to undergo a wrapping process, they should be presented to the wrapping-up machine all similarly arranged, or oriented and positioned in a single direction.

However, as is also well known, these articles are randomly supplied to the wrapping-up machine, that is in a discontinuous bulk supply, either directly from the outlet of producing machine(s), or by withdrawing them from one or more cold stores, whereby it is required to respectively orientate and position them prior to supply to the wrapping-up machine.

Devices located between the bulk feed source for the articles and the wrapping-up machine for arranging the same are already known. These prior devices have been devised according to a somewhat complicated and expensive functional structure capable of operating only for an orientation of the articles in the bearing and conveying plane thereof.

Thus, such structures are substantially based on using a plurality of conveying members, each of which is driven at distinct speed, namely at an increasing speed for each of the conveying members going from upstream to downstream relative to the conveying direction for the articles from the supply source to the wrapping-up machine. Said conveying members are so arranged to one another and in combination with reflecting means that the articles are subsequently transferred from a lower speed conveying member to the next higher speed conveying member, so as to space, orient in the bearing plane thereof, and align the articles thus transferred one after another and to supply the same to the wrapping-up machine.

The above structure of prior distinct speed multiple conveying member devices is practically embodied by either conveyor belts arranged substantially coplanar to one another in an aligned sequential relationship, or in a sloping or cross arrangement; or by more compact structures, i.e., requiring a less space, through disc and circular ring elements, respectively, which are also substantially coplanar and concentrically arranged with respect to one another so as to rotate in the same direction about a common central axis. The deflecting means is either stationary or provided with an independent motion, either a driving or a driven motion, and is arranged above and transversely of the feeding direction for the belts or disc, and the respective associated concentric circular ring or rings.

Thus, it is necessary with such devices that an operator, generally a female operator, should ensure that all of the articles be arranged according to a single location, or all bearing by the same face on the transfer plane, and this as far upstream as possible, thereby manually correctly positioning articles which are incorrectly positioned.

Conversely, the object of the present invention is to provide a device of the above type and use, capable of arranging bulk supplied articles, such as chocolates and other similar products, without any need for manual operation. This is achieved by first spacing the articles from one another, then orienting all of them in the same direction on a bearing and transfer plane, and finally individually and sequentially supplying them after one another to a wrapping-up machine in accordance with a predetermined single positioning array, i.e., all oriented and positioned in the same manner.

This has been made possible by providing such a device with a single rotatably movable member, taking advantage of its different increasing tangential speeds from the center of rotation to the periphery. Deflecting means gradually convey the articles from the central arrival zone on the rotating member to the periphery thereof and at the same time act upon said articles so as to present them at the feeding step to the wrapping-up machine according to an orderly sequence and all similarly oriented and positioned.

Therefore, according to the present invention there is provided a device for arranging bulk supplied articles such as chocolates and other similar products and individually sequentially supplying the same one after another to a wrapping-up machine in accordance with a predetermined single positioning array, comprising a single circular disc member rotatably driven about the vertical central axis thereof whereat the bulk articles to be arranged are caused to flow, elements shaped and disposed like stationary walls grazing above said rotatable circular disc member and parallel to the disc extending from inside to outside of said disc, said elements being disposed as sections respectively arranged successively in the direction of rotation for said disc, said elements having at least the side face thereof opposite to said direction of rotation for the disc inclined, with respect to the vertical of the bearing surface for the articles of said disc at an angle of about 16° to 45°.

By this structure for the arranging device according to the present invention, correct orientation of the articles is assured in accordance with a predetermined alignment, the articles delivered from said disc being all or at least nearly all disposed at a single positioning.

However, when an article should arrive adjacent the location where said articles leave the rotatable disc to pass to the supply step to the feeding devices to the wrapping up machine and with an other than correct orientation, according to a further feature of the present invention provision is made for automatically rejecting such misarranged articles.

This automatic rejection means is provided by arranging the last section of the deflecting means in cooperating relationship with the underlying rotatable disc, so as to extend to such a distance from the outer edge of said rotatable disc that, due to the centrifugal force resulting from the rotation of said rotatable disc and the bearing position itself on the disc for the article at such a location, said article is caused to drop out of the disc and, therefore, is automatically left out of the sequence of articles with a correctly aligned position.

Further features and advantages will be more apparent from the following description of some preferred, but not exclusive, embodiments of the arranging device according to the invention, as shown by way of example in the accompanying drawings, in which:

FIG. 1 is a schematic perspective view of a first embodiment of a device for achieving the unidirectional orientation of articles, some portions having been sectioned and broken away for better showing other portions; horizontal FIG. 2 is a schematic perspective view showing modified portion of FIG. 1;

FIG. 3 is also a schematic perspective view showing that portion of the device concerning the arrangement of the articles according to a second embodiment for achieving, in addition to the unidirectional orientation of the articles, the turning over of the articles so as to cause a single positioning thereof;

FIGS. 4 and 5 are enlarged schematic views showing details which are common to the two embodiments of the arranging device shown in FIGS. 1, 2 and 3;

FIGS. 6 and 7 are also enlarged views showing details of the embodiment according to FIG. 3; and FIGS. 8 and 9 are top plan views of the devices according to FIGS. 1 and 3 respectively.

Referring to these figures, wherein like or corresponding parts have been indicated by the same reference numerals, it will be seen from FIG. 1 that the schematically shown arranging device according to the present invention comprises a base 1, and above which a horizontal circular disc 2 is rotatably mounted in any known manner, this disc 2 being integrally carried by a shaft 3 extending vertically downwards within base 1.

A bracket 4 is attached by any known means to the bottom 1a of base 1, one leg thereof horizontally located, whereas the other upwardly vertically extending leg thereof carries an electric motor 5 also secured thereto by any known means.

Two pulleys 7 and can respectively, are keyed to the vertical shaft 6 of said electric motor 5.

A drive belt 9 is wound about pulley 7, this belt 9 also winding about a pulley 10 keyed to vertical shaft 3 of sprocket 2 so as to rotatably drive disc 2 in the direction shown by arrow f'.

A drive belt 11 is wound about pulley 8 and about a pulley 12 keyed on a vertical shaft 13 rotatably carried in any known manner by a bracket 1b extending from a vertical wall 1c of base 1. On the upper end of said vertical shaft 13 is keyed a bevel gear 14 meshing with a bevel gear 15 keyed on an end of a horizontal shaft 16 rotatably carried in any known manner by bracket 1d extending from the vertical wall 1c above bracket arm 1b.

A pulley 17 is also keyed on horizontal axis 16. A drive belt 18 is wound on pulley 17 and extends vertically upwards as to exist from base 1 through aperture 1e on the upper wall or top 1f of base 1 and winds about a pulley 19 keyed on a horizontal shaft 20. Shaft 20 is rotatably carried by two support elements 21 which are secured by any known means above the upper wall or top 1f of base 1.

An idle roller 22 is keyed on shaft 20 between support elements 21 and is thereby rotatably carried by these support elements 21. Similar idle rollers 23, 24 and 25 are rotatably carried about respective horizontal shafts 26, 27 and 28 by ears or lugs 21a, 21b and 21c on said support elements 21.

Support elements 21 also carry a plate 29 which is secured in any known manner by its ears 29a on a part 21d of support elements 21.

Plate 29 extends substantially horizontally from the idle roller 25 above the periphery of the rotatable disc 2 from where it has a downwards sloping length 29b which extends adjacent the central zone of disc 2, terminating thereat with a rounded edge 29c grazingly to said disc.

At the zone where said plate 29 begins to slope downwardly it is provided with downwardly facing ears or lugs 29d and by which an idle roller 30 is rotatably carried about a horizontal shaft 31 below said plate 29.

An endless belt 32 is wound about said idle rollers 22, 23, 24, 25 and 30 and rounded edge 29c of plate 29, thus being driven in the direction shown by arrow f''. Belt 32 thus acts as a conveyor belt, the upper transporting run thereof being driven above plate 29–29b by members 5, 8, 11, 12, 14, 15, 17, 18, 19 and 22.

Sidewise of said conveyor belt 32, i.e., along its longitudinal side edges relative to direction f'', small sidewalls 33 may be provided and carried, e.g., in any known manner by plate 29 to receive the flow of articles to be conveyed on said rotatable disc 2, as is more apparent in the following description.

Above rotatable disc 2, from its central zone and adjacent the end edge of conveyor belt 32, is located a deflecting element 34 carried so as to graze the upper surface of said disc 2 by a supporting arm 35 itself carried by a column 36 projecting vertically upwards from the upper wall or top 1f of base 1.

Said deflecting element 34, to be described more particularly in the following, is of a generally substantially hemicircular planimetric shape extending from the aforesaid central zone of rotatable disc 2 towards the periphery of the latter so as to define a spiral path with respect to the rotatable surface of disc 2.

A further deflecting element 37 is located adjacent to said deflecting element 34 and downstream thereof relative to direction f'. Element 37 is similarly carried grazing the upper surface of rotatable disc 2 by a corresponding supporting arm 38 carried by a column 39 also projecting upwardly from the upper wall or top 1f of base 1.

Said deflecting element 37 is generally of a substantially rectilinear shape extending from the peripheral zone of disc 2 wherein the deflecting element 34 terminates to the inside of said disc.

From the zone where the deflecting element 37 terminates, a further deflecting element 40 starts, also grazingly carried above the upper surface of rotatable disc 2 by a corresponding supporting arm 41 carried by a column 42 upwardly vertically projecting from the upper wall of top 1f of base 1.

This deflecting element 40 is generally of a substantially hemicircular planimetric shape extending from the aforesaid starting zone thereof and to the periphery of the disc 2 so as also to define a spiral path relative to the rotatable surface of disc 2. Deflecting element 40 comes by such a spiral path at a distance from the outer edge of said disc 2 which related to at least one of the dimensions for the product being processed, then continues with a straight length 40a tangential to the outer edge of disc 2 at the end of the spiral path for deflecting element 40 (see also FIG. 8).

The connections between arms 35, 38 and 41 with the associated columns or studs 36, 39 and 42 and respective associated deflecting elements 34, 37 and 40 are provided by any known system such as to allow a wide range of positions for said deflecting elements 34, 37 and 40 with respect to the underlying rotatable surface of disc 2. Thus depending upon the type and shape of product to be arranged the most convenient angle of impact for individual articles can be predetermined, practically this has been found not to exceed 45°.

Parallel to said straight length 40a of the deflecting element 40 a conveyor belt 43 is provided. The upper run of belt 43 is coplanar to the upper surface of rotatable disc 2 and serves to receive, as shown hereinafter, the aligned articles coming from said rotatable disc 2 and to supply them to devices, not shown in detail in the drawings, such as those according to our pending application No. 1830A/68, providing to supply such articles after one another to a known wrapping-up machine, schematically shown at 44 in FIG. 1. Said conveyor belt 43 is wound about idle rollers, only one roller 45 of which is shown in FIG. 1, and driven in any known manner, independently or by the driving motor of the wrapping-up machine or subject arranging device.

Further, small sidewalls 46 are providing along the longitudinal sides of the conveyor belt 43 and carried in any known manner by base 1 and with the aid of a crossmember 47 for connection to the straight length 40a of deflecting element 40. The outermost small sidewall 46, in relation to the rotatable disc 2, terminates with its free end outwardly inclined at a level where the straight length 40a of the deflecting element 40 commences. At a location underlying this zone, a hopper element 48 is carried by base 1, this hopper element 48 serving to receive rejected articles which are not oriented in the correct direction, as will be seen hereinafter.

The deflecting elements 34 and 37 have an end face thereof 34a and 37a, respectively, inclined relative to the vertical to the upper surface of rotatable disc 2 at an angle of 30° (see also FIG. 5), whereas the deflecting element 40 is of a rectangular cross section.

The deflecting element 34 which, as above stated, has a comparatively thin walled configuration of a substantially circular planimetric extension, can be provided, for example, by cutting an overturned hollow conical body by two planes parallel to each other and at right angles to the axis of the cone.

The sloping of faces 34a and 37a of deflecting elements 34 and 37 forming, as seen hereinafter, the impact faces or walls for the articles to be arranged, serves the purpose of increasing the reaction forces between the two bodies, or between the article and impact face or wall (see diagram of FIG. 5). This facilitates the relative movement of the articles with respect to the bearing surface of the rotatable disc and thus, in the case of articles having a planimetric contour with different length parameters, facilitates the arrangement of said articles with the major length parameter tangential to the movement direction of said rotatable disc.

The above-described arranging device, for a single orientation only of the articles in the bearing plane thereof, operates as follows:

Assuming that by the above-described driving means said rotatable disc 2 and conveyor belt 32 and 43 are moving in the direction of arrows $f'$, and $f''$ and $f'''$, respectively, articles O moved on said conveyor belt 32 and all bearing with the same face thereof (see FIG. 8), are conveyed and unloaded by said conveyor belt 32 at the central zone of rotatable disc 2 which, by rotating in the direction of arrow $f''$, subsequently causes such articles to impact against the deflecting element 34. The spiral arrangement of this deflecting element 34, extending from inside to outside relative to the bearing surface of rotatable disc 2 and the sloping of face or wall 34a of deflecting element 34 cause the articles to graze on said bearing surface of rotatable disc 2 and to move to the periphery of said rotatable disc subsequently increasing the transfer speed thereof, so as to be spaced from one another and oriented in the bearing plane thereof with the major length parameter tangential to the direction of rotation of said disc.

Now, should the articles be more or less completely in side-by-side relationship, on continuing to travel on the rotatable disc, such articles are brought to impact against face or wall 37a of deflecting element 37 which, due to its sloped configuration and arrangement relative to disc 2, would separate them and orient them at the same time so as to proceed to the deflecting element 40. Element 40 maintains them oriented and sequentially aligned one after another and further spaces them from one another by leading them to the disc periphery. From there the conveyor belt 43 supplies them in alignment to the above-mentioned feeding device one after another to the wrapping-up machine 44.

Where an article arrives at the periphery of rotatable disc 2 at the level of hopper 48 in an incorrectly oriented position (see FIG. 4), because of the centrifugal force resulting from the peripheral speed of said rotatable disc 2, such an article is removed by dropping into the collecting hopper 48, i.e., it is eliminated from the article row prior to moving on conveyor belt 43.

As it will be appreciated, the present device assures, by this automatic orientation and automatic removal of incorrectly oriented articles that the supply to the wrapping-up machine is carried out with a sequence of articles, all of which are similarly oriented.

FIG. 2 shows a modification to the embodiment of FIG. 1, this modification concerning the arrangement of the conveyor belt 43 for the article delivered by rotatable disc 2, this outlet conveyor belt 43 being arranged at 90° relative to the conveyor belt 32 instead of being parallel thereto.

FIG. 3 shows an arranging device which, in addition to unidirectional orientation of the articles, causes an overturning thereof, so the device causes all such articles to be arranged according to a single location.

In accordance with this embodiment, the deflecting elements 34 and 37 as described in connection with the embodiment shown in FIGS. 1 and 2, are replaced by deflecting elements indicated by reference numerals 49 and 50, respectively. These deflecting elements 49 and 50 are of a general configuration differing from that of deflecting elements 34 and 37 and such as to be equivalent to that obtainable, for example, by cutting a hollow cylindrical body through two planes parallel to each other but inclined to the axis of the cylinder. These deflecting elements 49 and 50 are so shaped and arranged with opposing concave faces thereof, as shown in FIGS. 3 and 9, firstly provide for spacing and unidirectional orientation of the articles and then positioning all of such articles according to a single location thereof by overturning those articles which are incorrectly positioned, as seen hereinafter. Thus, the deflecting element 49 serves the same purpose as previous deflecting element 37, i.e., to space and orient the articles in the bearing plane thereof according to the major parameter tangentially to the feeding direction thereof on the rotatable disc 2. Deflecting element 50, which on its concave surface is provided with a plurality of depressions 50a parallel to one another and extending from bottom to top in the direction of rotation of said rotatable disc 2 and a projection 50b having a triangular cross section (see FIGS. 6 and 7), serves the purpose of overturning any articles in other than a desired location.

What is claimed is:

1. A device for arranging articles supplied in bulk, and for individually and sequentially delivering them one after another to a wrapping-up or similar machine in accordance with a predetermined positioning array, comprising a horizontally disposed flat circular disc member rotatably drivable about a vertical central axis thereof, means for supplying said articles in bulk to said disc adjacent the zone of said central axis, and a plurality of stationary abutment elements for engaging and orienting articles disposed on said rotatable disc, said elements being fixedly mounted above said rotatable circular disc member and parallel to the plane of said disc, and being respectively sequentially arranged in the direction of rotation of said disc from the inside to the outside thereof, and said stationary abutment elements having at least one side surface facing the direction of rotation for the disc, and facing angularly downward in an inclined relationship defined by an angle from about 16° to 45° with the vertical, whereby said abutment elements function to align parallel piped articles deposited centrally of said disc, upon rotation thereof, to orient said articles identically at the outside of said disc for subsequent wrapping.

2. A device according to claim 1, wherein at least part of said stationary abutment elements are spirally arranged relative to said rotatable disc.

3. A device according to claim 2, wherein said spirally arranged part of said elements is of a comparatively thin walled configuration and substantially circular in a plan view.

4. A device according to claim 2, wherein said spirally arranged part of said elements is of a comparatively thin walled configuration and substantially elliptical in a plan view.

5. A device according to claim 3, wherein said spirally arranged part of said elements is formed of a wall section of a hollow downwardly divergent conical body cut by two planes parallel to each other and normal to the axis of said conical body.

6. A device according to claim 4, wherein said spirally arranged part of said elements is formed of a wall section of a hollow cylindrical body cut by two planes parallel to each other and inclined relative to the axis of said cylindrical body.

7. A device according to claim 1, wherein the length of the outermost downstream abutment element is provided at a location extending to a distance spaced from the outer edge of said rotatable disc corresponding approximately to a minor dimension of a single article, so that an article which reaches said location in an incorrectly aligned position is caused to drop from said disc while all articles which reach said location correctly aligned are for sequential delivery to a wrapping-up machine.

* * * * *